United States Patent [19]

Edgar et al.

[11] Patent Number: 5,572,339
[45] Date of Patent: Nov. 5, 1996

[54] FILM SCANNING SYSTEM AND METHOD

[75] Inventors: Albert D. Edgar, Austin; Steven C. Penn, Georgetown, both of Tex.

[73] Assignee: International Business Machines Corporation, Armonk, N.Y.

[21] Appl. No.: 269,335

[22] Filed: Jun. 30, 1994

[51] Int. Cl.$^6$ .......................... H04N 1/04; G03D 13/02; G03D 13/08; G03D 13/14
[52] U.S. Cl. .......................... 358/494; 358/487; 358/490; 358/493; 358/496; 396/639; 396/642; 396/646; 396/651
[58] Field of Search .................................. 358/487, 490, 358/491, 493, 494, 491, 496; 354/339, 334, 337, 340, 344, 275

[56] References Cited

U.S. PATENT DOCUMENTS

| | | | |
|---|---|---|---|
| 2,435,250 | 2/1948 | Tandler et al. | 358/491 |
| 3,958,250 | 5/1976 | Rolon | 358/493 |
| 4,725,891 | 2/1988 | Manian | 358/285 |

*Primary Examiner*—Edward L. Coles, Sr.
*Assistant Examiner*—Tia M. Harris
*Attorney, Agent, or Firm*—Robert M. Carwell

[57] ABSTRACT

A scanner housing encloses a rotatable cylindrical drum, the outer surface having opposing rims or hubs which support respective outer edges of a film strip or slide to be scanned. The edges of the film are releasably held flat against respective rims by means of bands contacting respective radially outer edges of the film to maintain them against the respective outer rim surfaces of the drum whereby the film rotates with the drum's rotation past a scanner assembly. The scanner assembly is disposed internally of the housing adjacent one outer side of the drum and includes a linear array scanning transducer. A light source is located adjacent an opposing outer side of the drum at a location substantially diametrically opposed from the scanner assembly. A focusing lens assembly is disposed internally of the drum between the light source and the scanner assembly. The film being carried on the outer circumference of the rotating drum as the drum rotates, passes adjacent the light source. Light from the source thereby is directed from the light source through the film, the lens assembly, and impinges upon the scanning array whereupon the portion of the film adjacent the light source is thereby scanned.

23 Claims, 9 Drawing Sheets

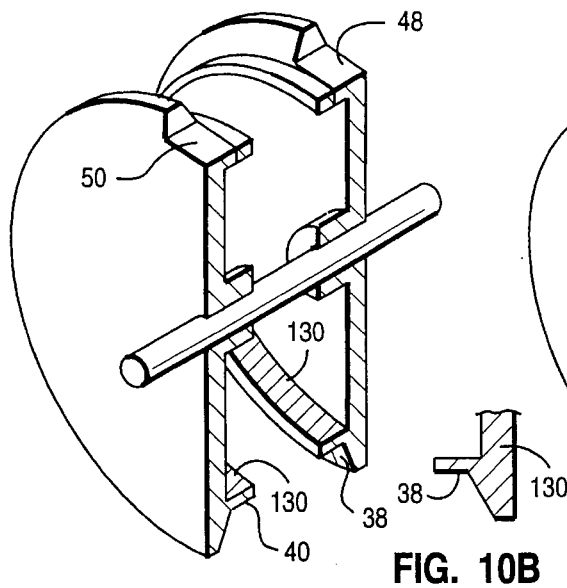
FIG. 10A FIG. 10B
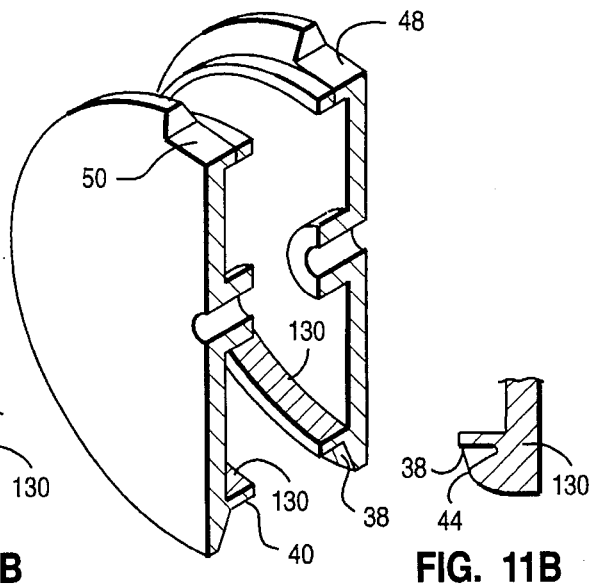
FIG. 11A FIG. 11B
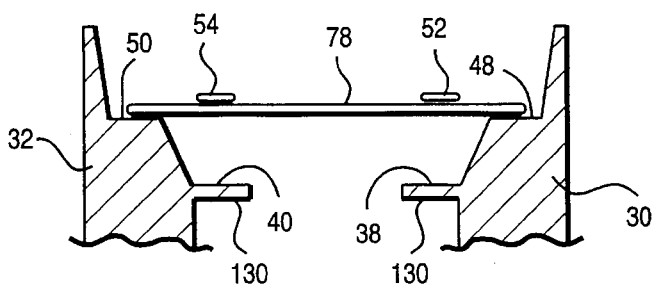
FIG. 12
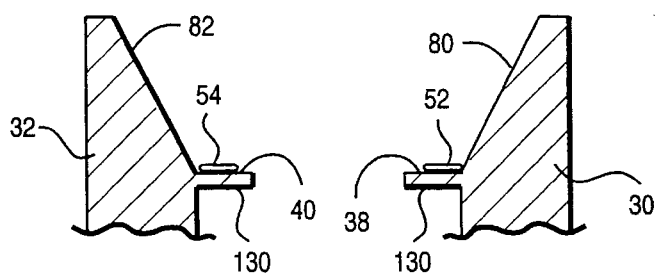
FIG. 13
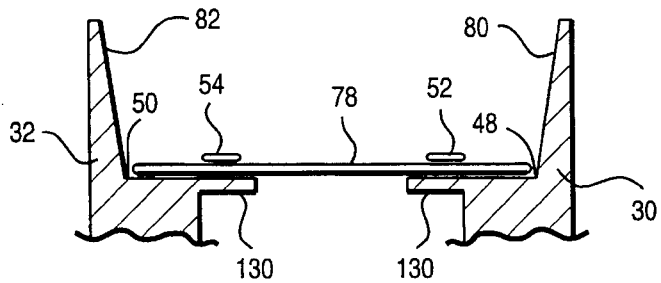
FIG. 14

FILM SCANNING SYSTEM AND METHOD

TECHNICAL FIELD

The invention relates to apparatus for generating images from optical film and, more particularly, to scanning technology for obtaining electronic scans of filmstrips, transparencies, and the like.

BACKGROUND OF THE INVENTION

In the photographic arts, as low cost computer processing became available, technology emerged for generating an electronic scan of film in order to capture and store digitized electronic images from the film. These scans were useful for archival and editing purposes, image enhancement and processing, and the like.

Emphasis in the development of such scanners was upon those adapted for transparencies and, more particularly, for mounted transparencies as opposed to negative films for several reasons. The term "film" will be used hereinafter generically to include such transparencies except where in context it is apparent that a strip of film is intended.

This emphasis on transparencies was notwithstanding that in many respects negatives are superior to transparency technology. For example, cost of film and processing for negatives may perhaps be half of that for transparencies. Negatives also require less time to process and fewer chemical steps, and typically provide better quality over wide exposure ranges, having a gamma or signal level less than half that of transparencies, allowing a much greater brightness recording range. While this in turn normally makes dust, scratches, and other anomalies more noticeable, with the advent of computer image processing this drawback may now be overcome. See, for example, U.S. Pat. No. 5,266,805, issued Nov. 30, 1994 and entitled *System and Method for Image Recovery*.

A consequence which results from such quality is that negatives may also be archived in less space. Because of the increased dynamic range, quality, contrast and the like, there are fewer rejects and therefor fewer photographs needed to be taken for a given situation if archived as negatives rather than as transparencies. The effects of selecting multiple filters and apertures or exposures could be simulated by computer processing of negatives to emulate the wide variations associated with these techniques more conventionally obtained with transparencies. The equivalent to multiple transparency exposures could thereby be simulated with post computer processing of negatives to compensate for or simulate daylight, fluorescent or incandescent lighting, color effects, etc. whereby the post-processor could be employed to select and vary the colors and resolutions. In other words, the "bracketing" technique commonplace in the photographic arts with transparency work could be eliminated with scanned negatives.

With all the foregoing obvious benefits to working with negatives, an explanation is helpful as to why, until recently, scanner development nevertheless still focused upon transparency work and particularly mounted transparencies. First, most published pictures are generated from transparencies for numerous reasons. For example, lithographers typically feel that better results are obtained from transparencies than from prints obtained from negatives (which by definition are second generation images). Although negatives have a much wider brightness recording range than transparencies, transparencies have a wider range than prints made from the negatives. The inconvenience of and necessity for prints for an art director to review when working with negatives and the lesser quality of such prints compared to transparencies thus gave rise to the popularity of transparencies over negatives.

With prints heretofore as the main practical presentation medium for negatives, the numerous favorable aspects of negatives hereinbefore noted were thus not generally being realized. The necessity of prints from negatives was resulting in the most costly imaging systems, with the lowest quality, and the most difficulty in archiving.

With the advent of computer scanning and imagery, the emphasis has continued to be on scanning of transparencies and more particularly mounted transparencies, notwithstanding the benefits of negatives. The scanning of "slides" has become a common practice for computer image capture and processing. Secondary to the scanning of slides has been the scanning of film transparencies, which has received much less development work for several reasons. In such scanners a scanning element effects a linear motion across the film surface in a direction transverse to the longitudinal axis of the filmstrip. Such linear motion was frequently found to present numerous problems. For example it was difficult to provide for the linear scanning motion in an inexpensive manner which nevertheless provided for high resolution in the scanning process.

It was also commonplace for strips of film to exhibit curvature which, upon scanning, results in serious focus distortions. In an effort to solve this problem, one approach was to provide the linear scanners with a transparent cover over the transparency film, thereby presenting a flat surface to the scanner. While this solved the aforementioned distortion problem, yet other problems were thereby introduced, namely the scratching and other degradation of the film surface by the cover in contact with the film, and additional dust and foreign material on the cover itself.

In another type film holder, the image being scanned was not covered, but was held by pressing adjacent film against a flat surface, thus only adjacent images were exposed to scratching and transfer of dust, and the image being scanned was not as precisely held flat.

Yet another drawback of such scanners was that they were typically limited to relatively short, non-continuous strips. This was due to the aforementioned need to maintain a flat film surface to present to the scanner.

Still another problem associated with typical such transparency scanners was that again, in order to maintain a flat scanning surface, the sides of the filmstrip were typically held by various mechanical contrivances. This thereby limited the flexibility with which one was able to vary the horizontal width of the scan to the maximum extent necessary to capture an image (which may extend close to the edge of the strip).

For all the foregoing reasons, it was highly desirable to develop a film scanner adapted for scanning negative filmstrips which (with the advent of inexpensive computer processing) could capitalize on the vast potential provided by capturing negative images from filmstrips for subsequent postprocessing.

It was a further object of the invention to provide a transparency film scanner which would present a substantially flat film surface to the scanner, thereby avoiding edge focus problems.

Yet another object of the invention was to provide such a surface in a manner which would avoid damage to the film surface rising from contact therewith, such as surface scratches and the like.

It was still a further object of the invention to provide for such a scanner which could accommodate longer filmstrips while obviating the need for linear film magazines or the like which would otherwise become impractical with long filmstrip segments.

It was yet an additional object of the invention to provide for such a scanner which might operate in a continuous fashion over the entirety of the extended filmstrip.

A further object of the invention was to provide for such a filmstrip scanner which could improve the accuracy of the scanning by means of rotary motion.

These and other objects and benefits of the invention are achieved and may be better understood with reference to the accompanying figures wherein:

BRIEF DESCRIPTION OF THE DRAWINGS

FIG. 10A is a partial sectioned pictorial view of the drum assembly of FIG. 7;

FIG. 10B is a sectioned view of a portion of the drum assembly of FIG. 10A, illustrating one form of a film support shoulder thereof;

FIG. 11A is another view of the drum assembly similar to that of FIG. 10A, illustrating another form of film support;

FIG. 11B is a sectioned view of a portion of the drum assembly of FIG. 11A, illustrating an alternate embodiment of a support shoulder with a film retainer;

FIG. 12 is a partial front section of a drum assembly of FIG. 7 taken along line 7—7 illustrating one mechanism for retaining slides thereon;

FIG. 13 is a partial front section of another drum assembly similar to that of FIG. 12 illustrating another mechanism for retaining a filmstrip thereon;

FIG. 14 is a partial front section of another drum assembly similar to that of FIG. 12 illustrating another mechanism for retaining slides thereon;

SUMMARY OF THE INVENTION

A scanner housing encloses a rotatable cylindrical drum, the outer surface having opposing rims or hubs which support respective outer edges of a film strip or slide to be scanned. The edges of the film are releasably held flat against respective rims by means of bands contacting respective radially outer edges of the film to maintain them against the respective outer rim surfaces of the drum whereby the film rotates with the drum's rotation past a scanner assembly. The scanner assembly is disposed internally of the housing adjacent one outer side of the drum and includes a linear array scanning transducer. A light source is located adjacent an opposing outer side of the drum at a location substantially diametrically opposed from the scanner assembly. A focusing lens assembly is disposed internally of the drum between the light source and the scanner assembly. The film being carried on the outer circumference of the rotating drum as the drum rotates, passes adjacent the light source. Light from the source thereby is directed from the light source through the film, the lens assembly, and impinges upon the scanning array whereupon the portion of the film adjacent the light source is thereby scanned.

DETAILED DESCRIPTION OF THE PREFERRED EMBODIMENT

Figure 1:
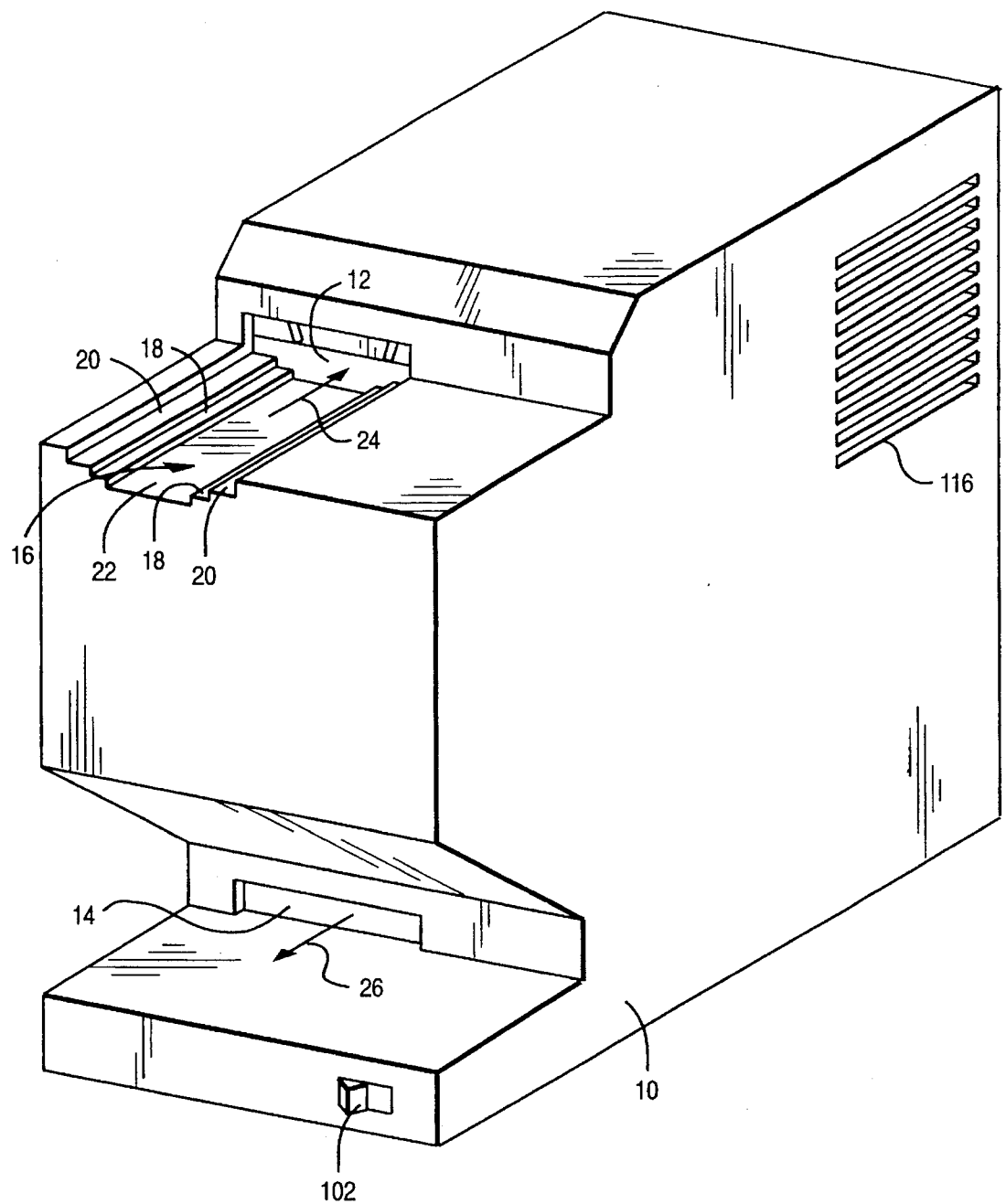
FIG. 1 is a perspective illustration of the scanner of the present invention.

Referring first to FIG. 1, a pictorial view of a preferred embodiment of the film scanner of the invention is shown. A protective housing 10 is provided in which is disposed the various electrical, mechanical, and optical subsystems to be hereinafter described in greater detail. First a very general description of the operation of the scanner first in order to facilitate an understanding of the description of the operation of the various components. The scanner is provided with a film entry aperture 12 and film exit aperture 14. A strip of film or slide is introduced into the aperture 12 in a manner to be described in the direction of arrow 24. Upon its introduction therein, a transport mechanism internal to the housing 10 translates the film or slide through a semicircular path around a drum assembly enclosed within the housing 10. Thus, the film or slide is urged toward the back of the housing 10 and downwards, whereupon, after it is scanned, it exits the exit aperture 14 in the direction of arrow 26.

Still referring to FIG. 1, a film/slide guide area 16 is preferably provided as part of the housing 10 and will be seen to include a plurality of pairs of guide shoulders 18, 20 and a guide surface 22, all of which lie in respective parallel planes. The purpose of such shoulders and surface is to accommodate film and transparencies of differing widths and to ensure that upon their introduction in the aperture 12, they are received by the transporting drum assembly in proper registry and orientation. In this manner they may be temporarily and reliably retained on the outer surface of the drum assembly during their traverse through the scanning path so as to maintain the integrity and resolution of the scan. Ventilator slots 116 may be provided in housing 10 as desired to vent heat.

Accordingly, in operation, a slide or film will be introduced into the film/slide guide area 16 so that it is parallel to the guide surface 22 and resting either upon the guide surface 22 or the opposing outer surfaces thereof are resting on the appropriate guide shoulders 18 or 20 (depending, of course, upon the width of the particular filmstrip or slide). The operator will then manually urge the film or slide along the direction of arrow 24, utilizing this guide surface or shoulders to maintain the orientation of the film/slide along the axis of arrow 24 until the film/slide is introduced sufficiently into the aperture 12 so as to contact the drum assembly (to be shown with reference to FIG. 2).

Upon urging the film/slide sufficiently into the aperture 12, the drum assembly will grasp the filmstrip or slide, drawing it further within the aperture 12 until it is within the housing 10. Upon engagement of the film/slide by the drum assembly, the operator may thereafter release the film/slide, as the translation and scanning operation are thereafter automatic and internal to the housing 10. After completion of the scan the operator may retrieve the scanned film/slide which will be expelled out the aperture 14.

Figure 2:
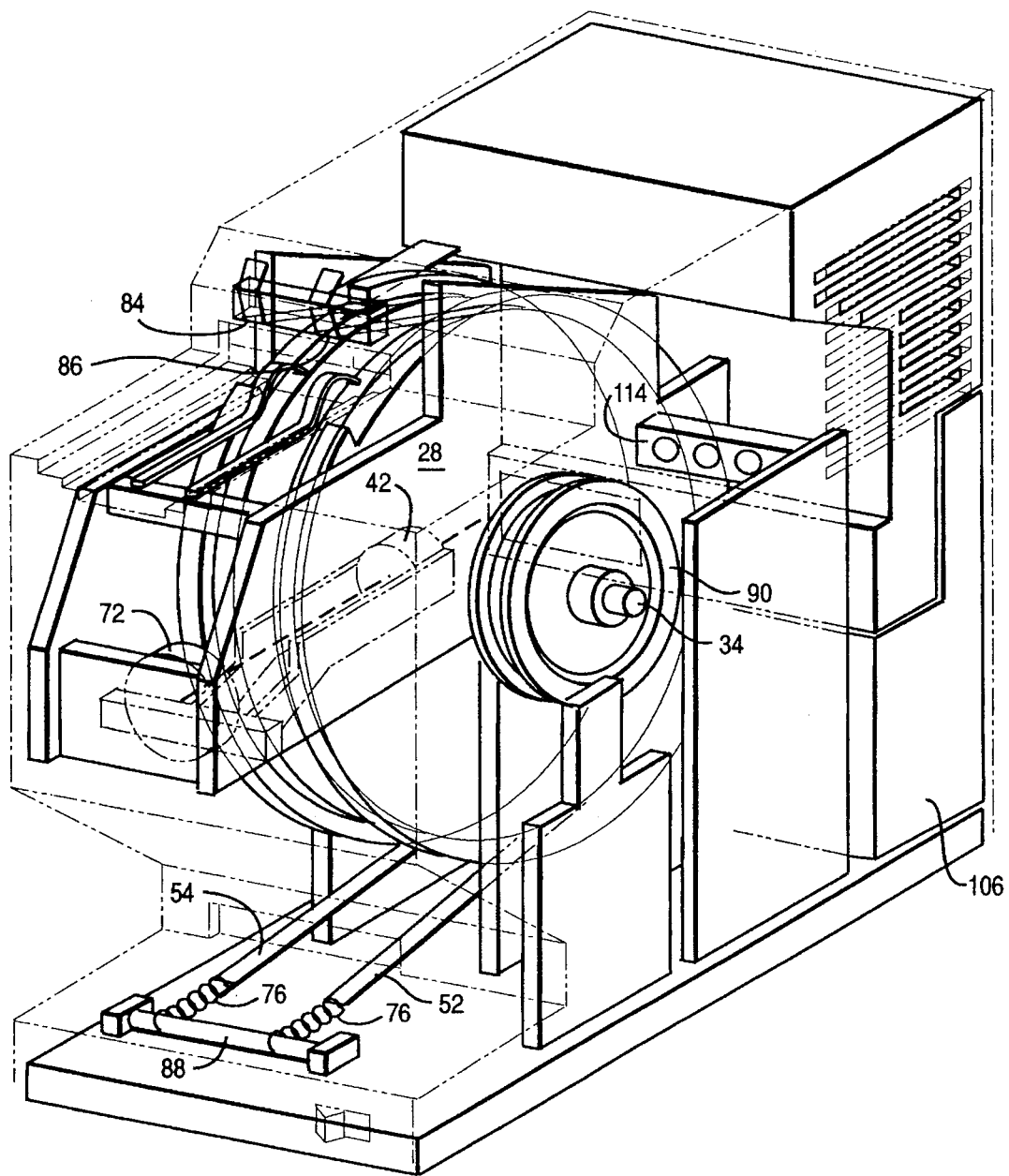
FIG. 2 is another perspective view of the scanner of FIG. 1 with the cover removed.
Figure 5:
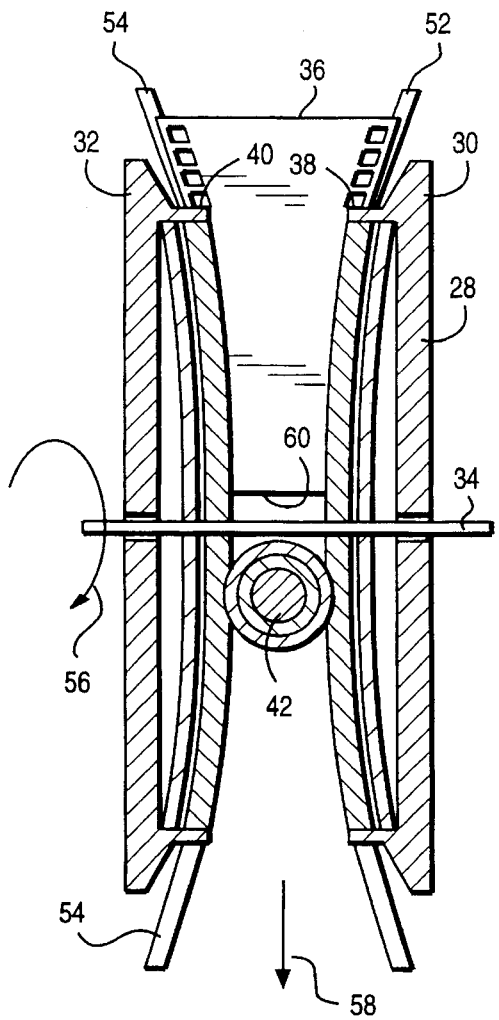
FIG. 5 is a front elevational view, partly in section, of a portion of the scanner of FIG. 2 illustrating part of the drum assembly and one mechanism for releasably supporting the film about the assembly's circumference.
Figure 8:
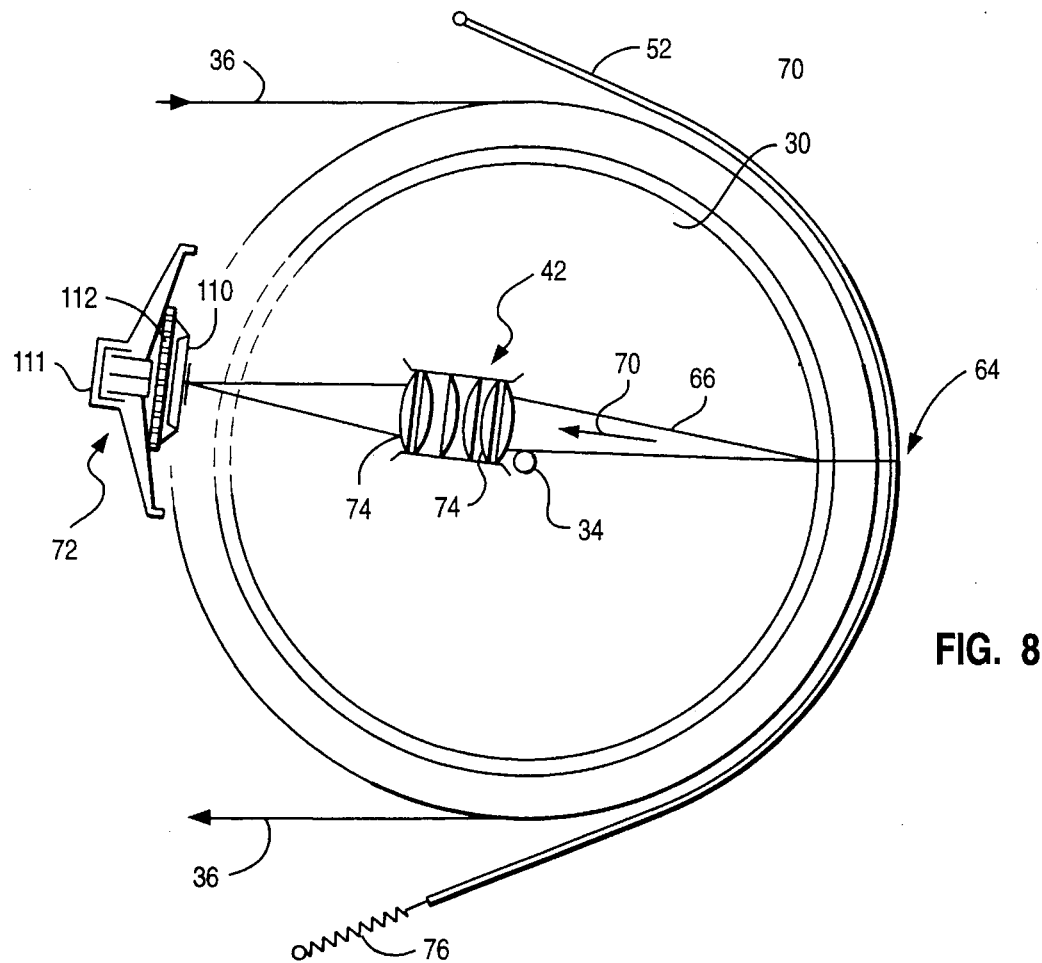
FIG. 8 is a simplified side elevational view of a portion of the scanner of FIG. 2 depicting the optical path of scanning light from the source, through the lens assembly, to the scanner assembly, and further illustrating a means for retaining the film on the drum assembly.

In order to more easily comprehend the various mechanisms depicted in FIG. 2 (which is an illustration of the scanner similar to that of FIG. 1 with the housing 10 removed) it will first be helpful to understand in a very general sense with reference to FIG. 5 and 8, how the film/slide is transported internally of the scanner and the optical path of the scan itself (FIG. 8).

Figure 7:
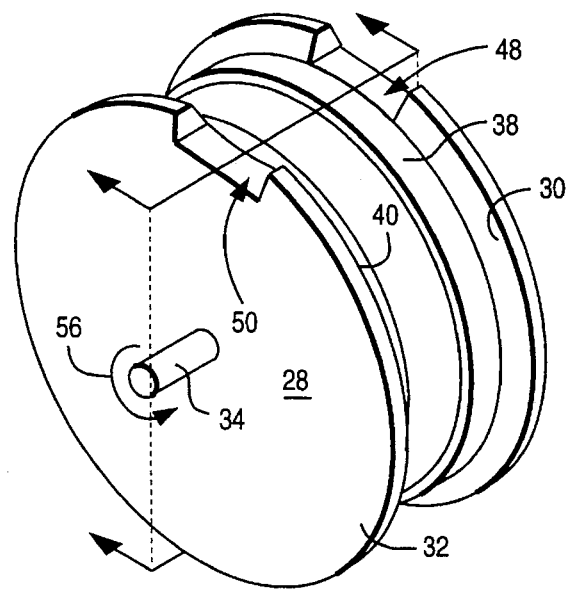
FIG. 7 is a simplified pictorial view of the drum assembly of the invention illustrating a mechanism for supporting a slide thereon.

Beginning with FIG. 5, the internals of the scanner, in a preferred embodiment, will include a drum assembly 28 (also shown pictorially in FIG. 7). The drum assembly will be seen to be comprised of a right and left disk-shaped half 30, 32. Each of these right and left halves of the drum assembly are identical and are supported by an axle 34 such that they may readily rotate together synchronously about the axle 34 as shown by arrow 56.

A close view of the drum assembly 28 indicates that the right and left half thereof are provided with a respective right and left film support shoulder 38, 40. Referring briefly back to FIG. 1, when the filmstrip is introduced in the upper film aperture 12, it will be travelling in the direction into the paper (at the top of FIG. 5 as illustrated therein). As the filmstrip 36 is introduced further into the housing, it will eventually (due to the registry provided by the guide area 16 or guide shoulders 18, 20, (FIG. 1) be caused to be supported by the film support shoulders 38, 40, as shown in FIG. 5. A right and left film/slide retention band 52-54 are provided to gently and releasably hold the opposing inner edges of the filmstrip 36 against the outer surfaces of the film support shoulders 38 and 40. (This may better be seen better in FIG. 8.)

As the drum assembly halves 30 and 32 are made to rotate about the shaft 34 in the direction of arrow 56 (FIG. 5), it will thus be appreciated that the filmstrip 36 will continue to be drawn into the film entry aperture 12 of FIG. 1. As the filmstrip rotates with the drum halves (while supported on the support shoulders 38 and 40), eventually the leading edge of the filmstrip 36 will traverse in a semicircular path around the axle 34 in the direction of arrow 56 until the leading edge 60 reaches the vicinity of the arrow 58. Upon its further rotational translation in the direction of arrow 58, this leading edge 60 of the filmstrip 36 will eventually appear in the exit aperture 14 (FIG. 1), at which point the operator may remove the film as it is expelled.

The optical path of the scanning process will now be described in further detail with reference to FIGS. 5 and 8. First, in FIG. 5, a lens assembly 42 is shown (which may also be seen in FIG. 8) which includes a plurality of focusing lenses 74. A light source 114 (shown in FIG. 2) is disposed internally of the housing 10 at a light source location 64 shown in FIG. 8. Disposed in a substantially diametrically opposed location from the light source is a transducer/scanner assembly 72 which includes a transducer 110 (preferably a linear array such as a TCD1300D available from Toshiba or a tricolor array such as the Toshiba TCD2301C—(when using a tricolor array, all three colors are scanned simultaneously and in registry and therefore only one color needs to be measured for alignment, the other colors following)) and appropriate scanner control circuitry 112.

On the inner surface of the right and left film support shoulders 38 and 40, a respective reticle will be imprinted. From the foregoing it will apparent that the scanner assembly will be looking in the direction into the page toward the lens assembly 42 and will thus be capable of scanning the reticles 130 (FIGS. 10A–14) as well as the inner surface of the film 36. Because the film is being transported along a drum assembly during the scan process and is stationary with respect to the drum assembly, the reticles 130 will provide a means for locating points in space and time along the longitudinal axis of the film 36 during the scanning process. Thus, these reticles 130 may serve as timing tracks or position locators during a scanning process. The scanning assembly would simply scan and recognize these gradient marks, translate and analyze them, and thereafter correlate them to the respective scan lines. One simple example of use of such a feature is that after the scan process, in examining the image if it is desirable to index back to the particular location on the film, for example to scan at a higher resolution, these reticles 130 make this possible. The motor controller driving the stepping motor which turns the axis 34 would simply generate the appropriate commands to the motor to cause rotation of the drum so that the desired area of the film to be re-scanned at a higher resolution will be located appropriately in line with the light source, lens assembly, and scanner assembly.

A second example of use of such a feature is that after the scan process, if the mechanics have wobbled or the motor advance changed speed, any distortions to the image will also occur to these reticles. By correcting the image of these reticles in the software resizing, the image on the film follows into precise correction.

Still referring to FIG. 8, as light 66 is emitted from the light source 114 at location 64, it will be seen to travel in the direction of the arrow 70, whereupon it is focused by the lens assembly 42 onto the transducer 110. Inasmuch as the film 36 is being rotationally translated through and across the optical path just described from the location 64 through lens assembly 42 to the transducer/scanner assembly 72, it will be readily appreciated that the light being picked up by the transducer 110 will, over time, result in a scan of the images contained in the film 36 as it traverses on the circumference of the drum assembly through this optical path. In passing, it will be noted that due to the presence of the support axle 34 in FIG. 8, the transducer/scan assembly 72 and light source at location 64, in the embodiment depicted, will preferably not be in perfect diametrically opposing relation but only substantially so because the axle 34 would otherwise lie in the optical path shown by arrow 70 interfering with the image to be scanned. This is not a problem because in almost all optical systems imaging film, the angle viewing the edges of the film is much steeper than the small angle required by offsetting the lens in this application. As will be discussed later, the transducer is normally a line array, also called a "linear" array, and therefore focus need be maintained across only a line on the film. If an area must be focused, as with, for example, a TDI (time delay integration) sensor, then the sensor surface can be tilted slightly while using the central axis of the lens in a focus technique common to view camera photography to maintain focus on a plane not perpendicular to the optical axis.

Still referring to FIG. 8, it may be seen that transducer/ scan assembly 72 consists of the transducer 110, which is preferably a linear sensor with sensor line positioned perpendicular to the rotation of the wheel, and associated scan control electronics 112, mounted on a focusing assembly 111. This assembly 111 may consist of a speaker that when energized moves the transducer 110 in a direction parallel to the optical axis to alter the focus and correct for scanning films of varying thickness.

Figure 6:
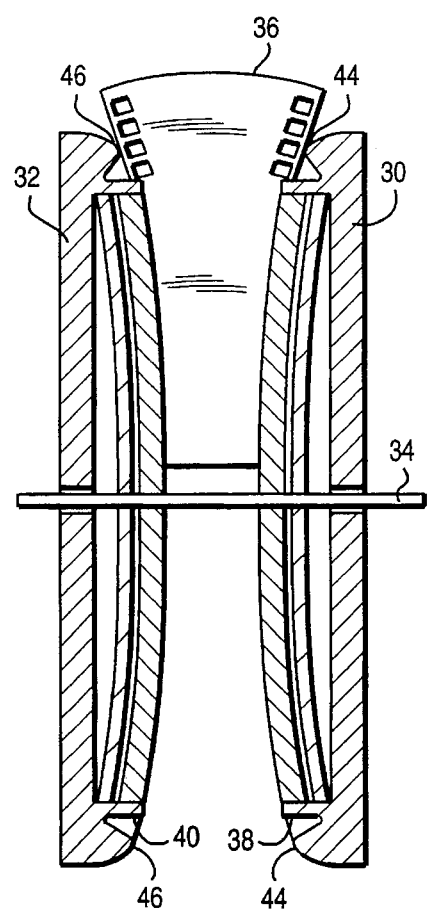
FIG. 6 is another view of the drum assembly similar to that of FIG. 5, illustrating another mechanism for supporting the film.

Referring to FIG. 6, a comparison to FIG. 5 will reveal that an alternate embodiment is shown for ensuring that the film 36 is releasably yet reliably retained on the right and left drum halves 30, 32, as it moves with the drum assembly during the scan process. In this embodiment, right and left film retention ridges 44, 46 are provided on the respective drum assembly halves which extend circumferentially about their respective halves, serving the purpose essentially of the retention bands 52 and 54 of FIG. 5 and obviating their need.

Figure 9:
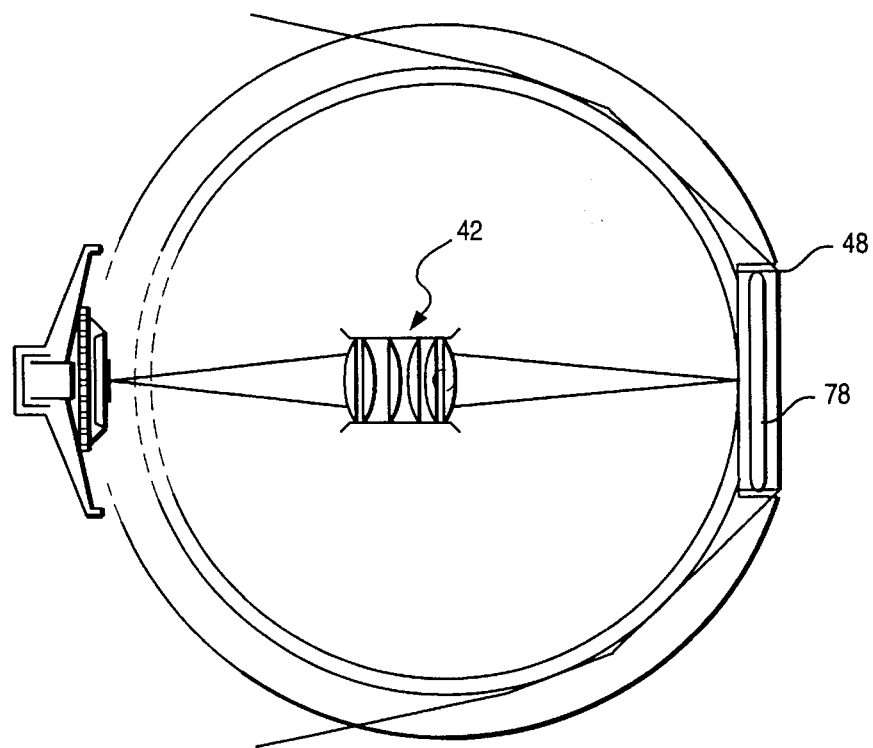
FIG. 9 is another view similar to that of FIG. 8, illustrating a mechanism for retaining a slide on the drum assembly.

Turning briefly to FIG. 7, yet an additional feature of the invention will be pointed out and described hereinafter in greater detail. It will be recalled that it is a feature of the invention to accommodate, in a single scanner, not only film in the form of strip but also in the form of filmstrips but slide transparencies as well. Accordingly, referring to FIG. 7, there will be seen depicted there in the right and left halves 30, 32 of the drum assembly 28, a corresponding right and left slide support slot 48, 50, each disposed in its respective drum assembly halve 30, 32. When a slide is introduced into the entry aperture 12 of FIG. 1 (either as it rests on the guide shoulder pair 18, 20, or slides along the guide surface 22), as the drum assembly 28 rotates in the direction of arrow 56 (FIG. 7), eventually these slide slots 48, 50 will be in the vicinity of the entry aperture 12. By the operator continuing to urge the slide into the aperture 12, eventually it will come to rest in and be supported by the slide slots 48, 50. This may be seen in FIGS. 9, 12, and 14.

As was the case with a filmstrip 36, in a preferred embodiment the film/slide retention bands 52, 54, will serve the same purpose that they did with respect to the filmstrip 36, namely to firmly but releasably cause the slide 78 to be retained in the slide slots 48, 50 (FIG. 7) as the slide is rotationally transported in the semicircular path circumferentially on the outer periphery of the drum assembly about the axis 34 in the direction of arrow 56. It will be noted in passing with reference to FIGS. 12–14, that in a preferred embodiment, each of the drum halves 30, 32, will be provided with tapered shoulders 80, 82, such that the slide 78, as it is introduced into the support slots 48, 50, will be guided into registry. In this manner the slide 78 will be retained in alignment gently by the walls of the tapered shoulders 80, 82, when the slide comes to rest on the bottom of slots 48, 50.

While only one slot pair 48, 50, is shown in FIG. 7, this was done for simplicity of illustration. It will be readily apparent that with only one such slot pair, the operator would have to wait during introduction of a slide in the entry aperture 12 until this slot pair had rotated around into position to receive a next slide through aperture 12. Accordingly, additional such slot pairs 48, 50, for receiving slides may be disposed about the circumference of the drum assembly right and left halves 30, 32, so that a vacant such slot pair will be ready to receive a slide in a more timely fashion. Yet an additional benefit to providing for multiple such slides slot pairs 48, 50 is that a plurality of slides may thereby be introduced and engaged in the scanning process at a given time when disposed about the drum assembly 28 at numerous locations.

Figure 4:
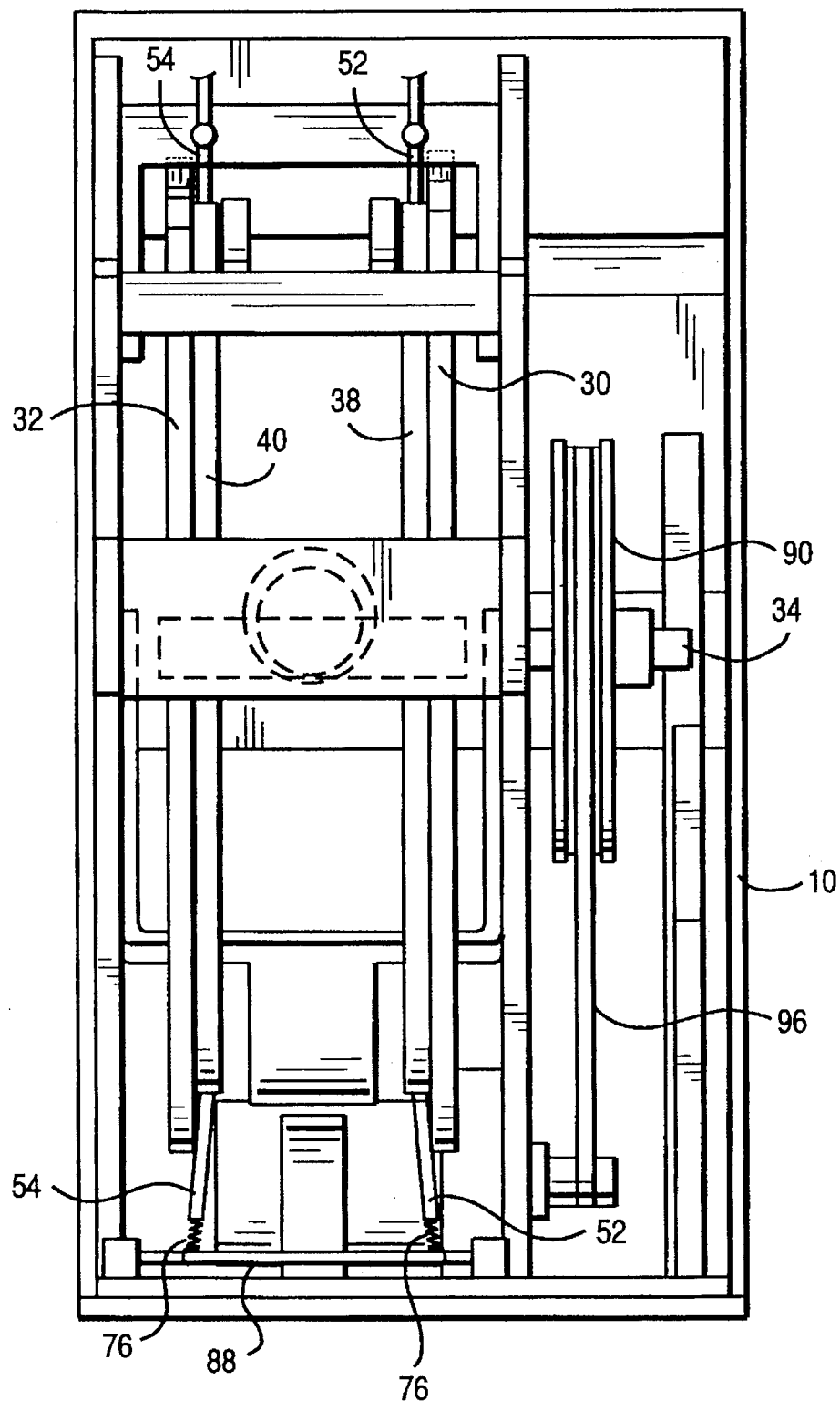
FIG. 4 is a front elevational view of the scanner of FIG. 2.

Now that the general physical operation of the scanner has been described, the components illustrated in FIG. 2 and FIG. 4 and their respective functions may now be understood more easily. Thus, in FIG. 2 and FIG. 4, the drum assembly may be seen, 28, supported by the axle 34. Similarly, the light source 114, lens assembly 42, and transducer/scan assembly 72 may be seen in FIG. 2. Additionally, two upper retention band terminations 84, 85 are shown and a lower retention band termination block 88. These serve to tether or terminate opposite ends of each of the retention bands 52, 54. It may be desirable to provide for springs 76 terminating the bands 52, 54, which is disposed between the ends of the bands and the outer edges of the film or slide when riding on the band termination block 88. The purpose of such springs is to provide some "give" to the bands as material (e.g. film or slides) are disposed between the bands and the outer circumference of the drum assembly halves 30, 32, which they contact in order to accommodate the thickness of the film and/or slides. In that the bands 52, 54, are terminated at both ends and the drum assembly 28 is in rotary motion contacting these bands, sliding friction will develop between the bands and the drum assembly 28. Accordingly, it has been found desirable to provide for such bands 52, 54, to be fashioned out of a teflon or like substance to facilitate this sliding motion. The springs 76, may be selected so as to provide the necessary amount of tension whereby the film and slides may be readily introduced and "sandwiched" between the drum assembly 28 surfaces and the bands 52, 54. Also, in passing, it will be noted that a power supply 106 is provided which will be described in greater detail with reference to FIG. 17.

Figure 3:
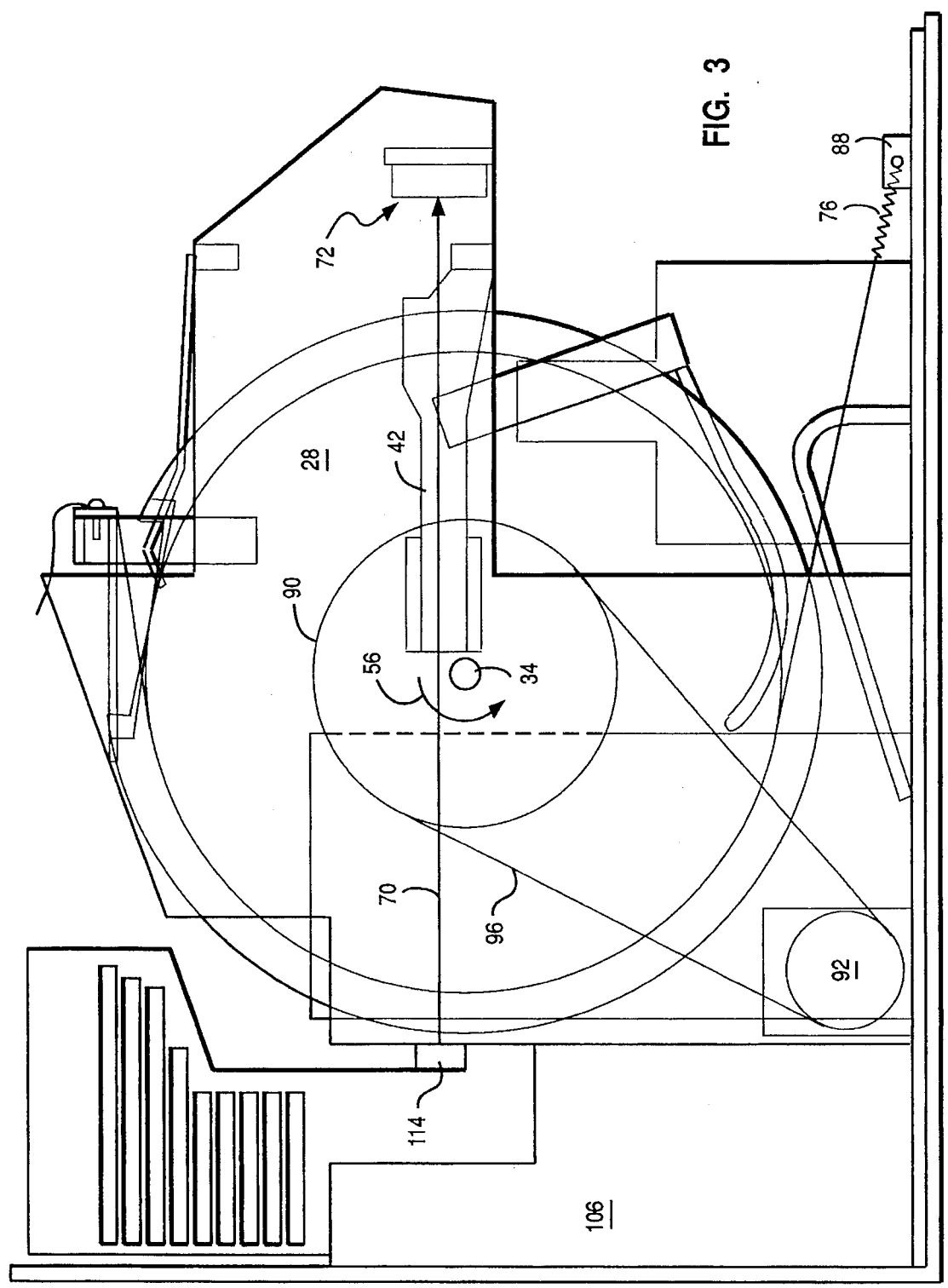
FIG. 3 is an side elevational view of the scanner of FIG. 2.

Turning to FIG. 3, a means is required for effecting the rotational translation of the drum assembly 28 about the axle 34. Accordingly, a suitable electric motor 92 is provided and a drive belt 96, interconnecting the motor 92 and drum drive wheel 90 so as to provide this rotational movement in the direction of arrow 56 of the drum assembly 28. The orientation of the light source 114, lens assembly 42, and transducer/scanner assembly 72 along the optical axis 70 may also be seen more clearly in FIG. 3.

Figure 17:
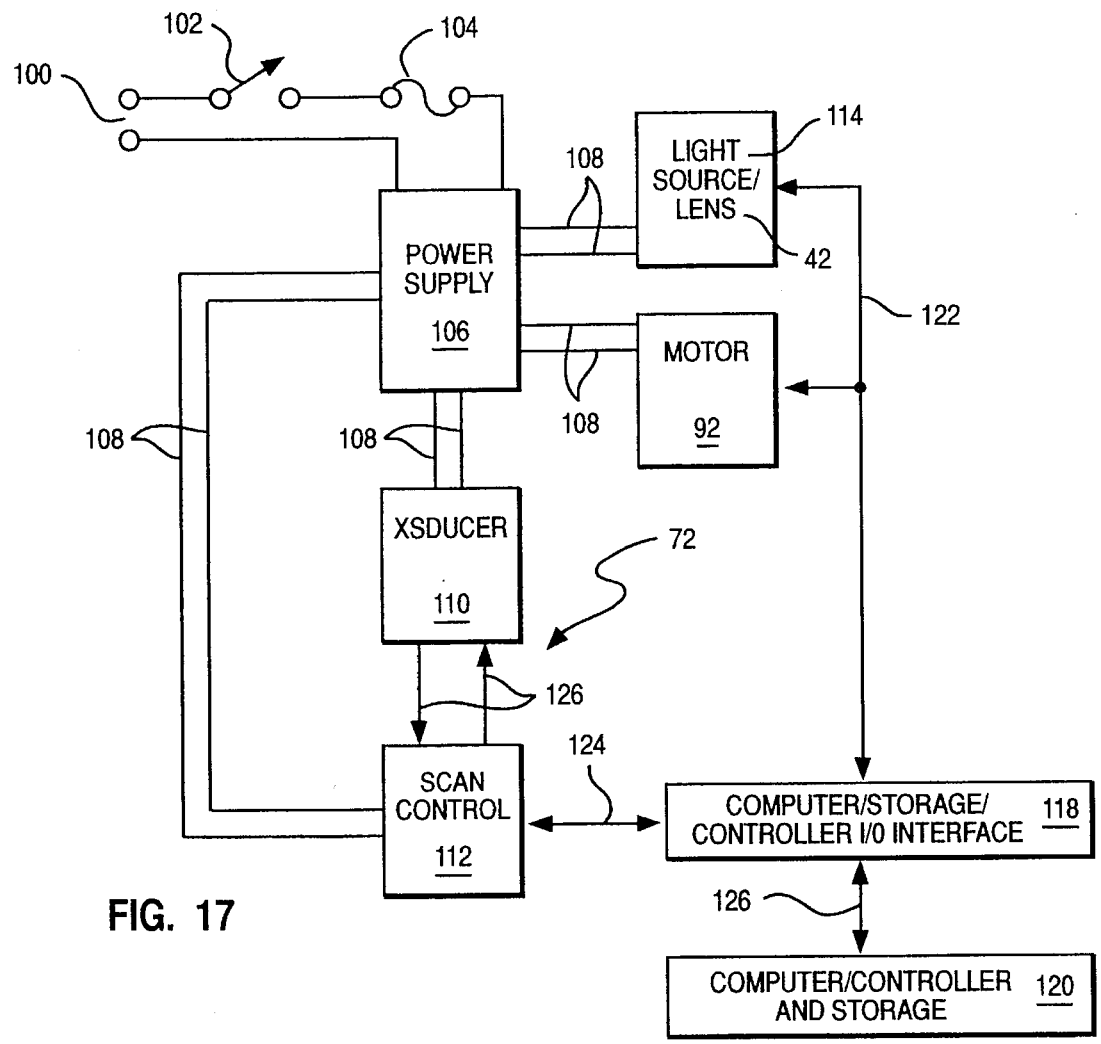
FIG. 17 is a functional block diagram illustrating the various electrical components of the scanner of FIG. 1.

Turning to FIG. 17, it will be appreciated that various electrical and electronic circuits and components must be provided to effect the scanning in accordance with the invention. Accordingly, in FIG. 17, a functional block diagram of such circuitry and components is depicted. The scan assembly 72, motor 92, light source 114, lens 42, and power supply 106 already previously discussed will be seen depicted therein. The scanner will be provided with a connection 100 to a suitable source of external power such as a 110 volt AC line. In accordance with conventional practice, a power switch 102 (also shown externally accessible in FIG. 1) will be provided in series with appropriate fusing 104 so as to energize the power supply. Dependent upon the particular motor, scan assembly 72, etc. which are employed, the general purpose power supply 106 depicted in FIG. 17 will generate the necessary supply of voltages as appropriate to power the light source, lens, motor, transducer, scan control, and the like, delivering power to such various components over power lines 108. It will be appreciated that the power developed by the supply 106 may take several forms as required by the various components, such as plus and minus DC voltages of various magnitudes, and the like.

Also shown in FIG. 17 is a computer/storage/controller I/O interface 118. The invention admits to several forms of scanner, depending upon the application, and thus may be substantially self contained and operated with an internal embedded controller or, in the alternative, may be intended to operate under control of an external computer or controller. In either case, means will be required for controlling operation of the various components just described and for at a minimum storing the scanning data derived from operation of the scanner (and even performing operations on such data if desired).

Accordingly, a general purpose functional block 118 has been shown to first illustrate that the various components in the scanner may, if desired, be controlled either by a computer or controller as an integral part of the scanner or controlled by an external such computer or controller. It may, for example, be desirable to alter the rotation of the motor 92 to effect changes in resolution or the like. Similarly, it may be desirable to alter the spectrum of the light source or even the focus or other operation of the lens assembly if electronically controllable. Similarly, it may be desirable to electronically control the scanning operation, e.g. the operation of the scan control 112 and even the transducer 110 itself. Accordingly, address/data/control lines 122, 124, have been shown extending from the computer/storage/controller I/O interface 118 to these various components, illustrating that in accordance with conventional computer science practices, these various functional subassemblies may be controlled as desired with these data address and control lines. The purpose of the I/O interface 118 is to provide an interface between these various subassemblies and components of the scanner and a computer, controller, and/or storage depicted generally as block 120. In its simplest sense, scanned data may be simply generated at the transducer 110, delivered over lines 126 to the scan controller 112, whereupon the scanned data is delivered on line 124 through I/O interface 118 to appropriate storage which may even be contained within the scanner if desired.

Similarly, an imbedded controller may be provided as a part of the scanner and shown as block 120. It will provide appropriate address, data, and command functions through the I/O interface 118 to the various components so as to internally control their operation in accordance with software associated with the controller much in the manner that modern appliances such as microwave ovens are being controlled. In the alternative, when external image processing and control of the scanner is desired, the scanner may obviously be controlled and its data dumped to an external computer system also intended to be generally illustrated by block 120. In such an instance, an appropriate adapter such as a conventional parallel port connector may be provided in the scanner so as to facilitate this electrical connection of data address and control lines 122, 124, to an appropriate computer interface 118 and ultimately to the controlling computer 120. In such all instance, the computer will thus enable its operator or be enabled by appropriate software to control the various components depicted in the electrical/electronic circuitry of FIG. 7 of the scanner in any desired manner. For example, the computer 120 may be provided with a program adjusting the manner in which the scan is made by the transducer, in which case, appropriate address, command, and data signals will be carried through the interface 118 over lines 124 to the scan control 112 and ultimately the transducer 110 to effect the desired form of scanning and data transmission back to the computer 120. As yet another example, an operator may enter into the computer 120 by means of a keyboard or the like, data indicating a particular type of film medium being introduced to the scanner or desired resolution. This may have implications in the desired scan rate or even in the rate at which the film or slides should be made to translate on the drum about the axis. In such an instance, the computer 120 might, for example, generate appropriate address, data, and command signals on line 126 through the interface 118 on lines 122 to the motor 92 so as to adjust the motor speed.

Figure 15:
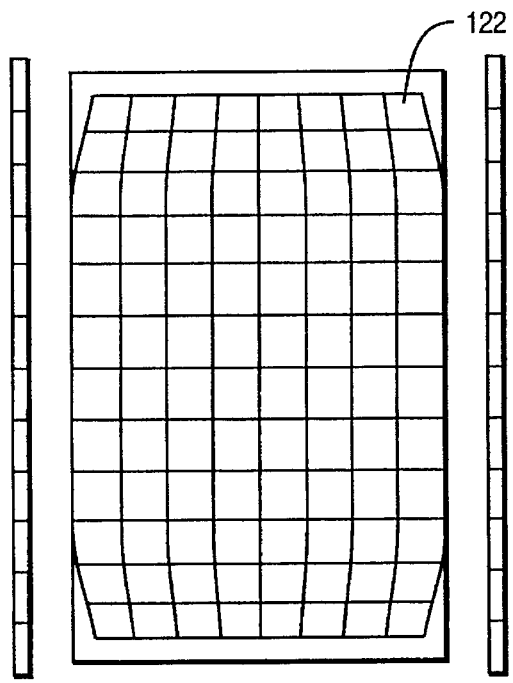
FIG. 15 is an illustration of a scan of a piece of film including, for illustrative purposes, a grid image in the image and further depicting deformation of the grid image after scanning caused by curvature of the film during the scan.

In FIG. 15, an illustration of a scanned image 122 is depicted therein, wherein the scan was performed when the film had a curvature relative to the wheel during the scanning process, as for example when scanning a flat mounted slide which does not curve around the wheel. The actual rectilinear grid in the original medium was uniform. However, due to the curvature of the film during the scanning process, the grid became distorted as shown in the image 122 of FIG. 15. One of the features of the invention and improvements over the prior art was to address the problem depicted in FIG. 15. It will be recalled from the background of the invention that a solution afforded in the prior art to avoid such distortion of FIG. 15 was to simply provide a linear magazine in which the film or slide could reside which had a transparent cover forcing the film flat against the magazine so as to avoid curvature. This however resulted in scratching of the film, leading to other distortions in the resulting scanned image.

Further details regarding the automated correction of distortion arising from film curvature and the like may be found in U.S. patent application Ser. No. 08/295,318, entitled "Scan Line Queueing for High Performance Image Correction", herein incorporated by reference. This feature of distortion correction will desirably employ the reticles 130 of FIG. 5 previously discussed which provide precise reference points along the longitudinal access of the film.

Figure 16:
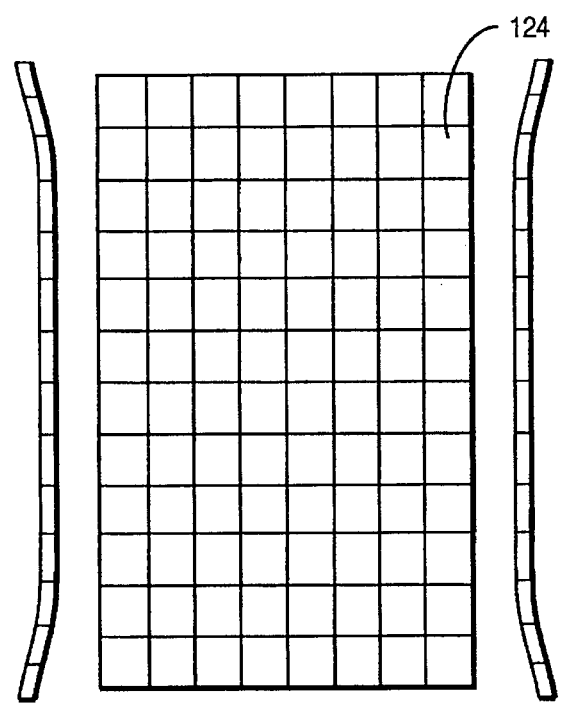
FIG. 16 illustrates a corrected grid image in comparison with that of FIG. 15.

As a result of the various means described in accordance with the invention, curvature of the film is thereby avoided, resulting in the desired accurate scanned image 124, such as that depicted in FIG. 16. The curvature in the resulting scanned image is avoided by transporting the film along an actuate path whereby at the point of scan the film is thereby in a flattened state. Such means for holding the film in the curved orientation are depicted, for example, in FIGS. 5 and 6, employing bands 52, 54, for example, or the film retention ridges 44, 46.

Figure 18:
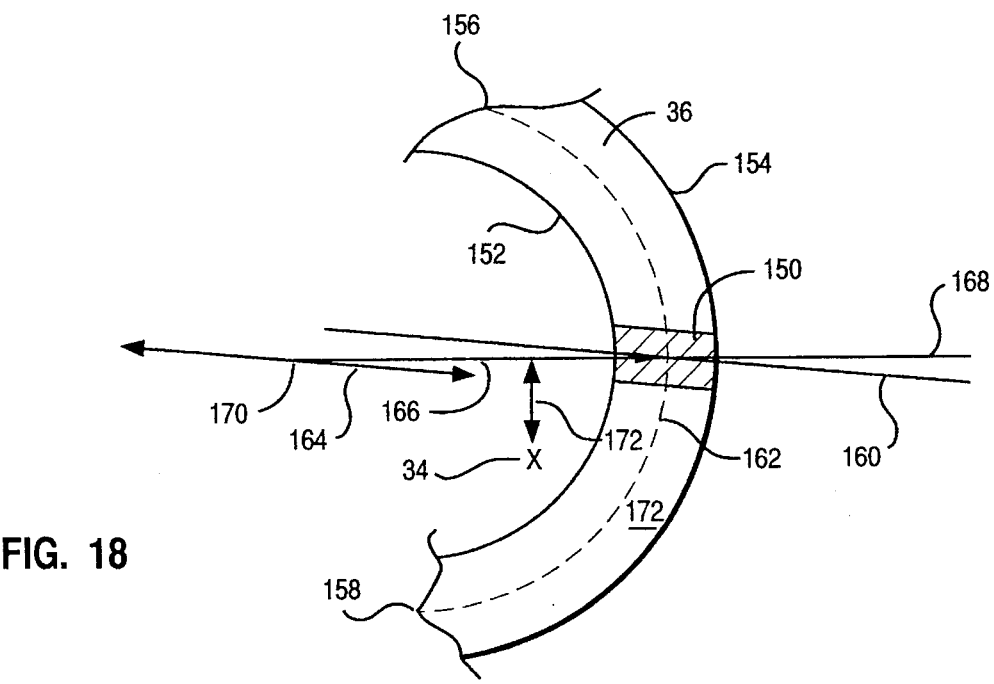
FIG. 18 is a schematic illustration of the geometry involved in the scanning process.

Turning now to FIG. 18, a schematic illustration of various geometrical points in the scanning process is provided which will assist in providing more precise terminology describing aspects of the invention.

First, the film 36 will be seen depicted therein disposed in an arcuate manner defining an imaginary curved path or arc 162. It will be recalled that this curved shape of the film arises from its disposition on the outer circumference of the drum assembly 28. First and second locations 168, and 170 are intended to schematically illustrate the location of the source of light and the scanning process along a scan line 164. The optical path of the scan is shown by line 166 intersecting the scan line 164, the film 36, and the first location of the light source 168. It will be noted that this line is offset by a small distance 172 from the axle 34 of the drum assembly so that the axle does not interfere with the scan process.

A scanning area 150 is shown on the surface 172 of the film 36. It is a feature of the invention that this scan area being presented to the scanner will be maintained in a substantially flat configuration so as to avoid aberrations and distortions associated with scanning curved film as in the prior art. It will further be recalled that the area 150 is held rigid by reason of its disposition in an arcuate posture and the fact that it is held against the film support shoulders of the drum assembly by means of the bands, retention ridges, or the like, along the edges 152 and 154 of the film 36.

In the preferred embodiment, the scanning process 170 occurs along a line that is moved across the film as the drum rotates. This makes the scanning area 150 on the film very thin, effectively a line. Even though the film 154 is curved in an arcuate manner, the film surface along the line defined by area 150 is held rigid and straight without the bowing normally associated with a flexible film held flat by the edges.

Yet another aspect of the invention is that the optical path of the scan is "direct" in the sense that nothing impedes the passage of light from location 168 to location 170 other than the film itself. It will be recalled that in the prior art the film is sandwiched in a plastic holder or the like in order to flatten the film for the scan process, resulting in the light having to pass through this plastic in addition to the film, thereby adversely affecting the quality of the scan.

In the preferred embodiment, the drum assembly 28 is in the form of a cylindrical drum. Accordingly, the arc 162 would essentially form a substantially semicircular arc 162 from the beginning point of the arc 156 to the end point 152, and, accordingly, would define a radius of curvature extending from the axle 34 to the inner surface 172 of the film 36. However, the invention is not intended to be so limited, and admits to other shapes of the arc 162. The first location 168 will be seen to be "outside" the arc 162 whereas the second location 170 may be said to be "within" the arc. A line 160 is further depicted transverse to and intersecting the arc 162. The line along which the linear scanning occurs, 164, will thus be seen preferentially to be parallel to this line 160 which traverses the film surface and intersects the arc.

While the invention has been shown and described with reference to particular embodiments thereof, it will be understood by those skilled in the art that the foregoing and other changes in form and detail may be made therein without departing from the spirit and scope of the invention.

We claim:

1. A method for scanning film comprising disposing said film along a curved path defining an arc, a segment of said path extending between and a first and a second location;

directing light from said first location through said film and said segment to said second location; and collecting by linear scanning said light at said second location;

moving said film along said path during said scanning; and wherein said arc defines a radius of curvature;

said film defines a scan area on a surface facing said second location; and said first and second locations and said scan area lie along a line parallel to and offset from said radius of curvature.

2. The method of claim 1 wherein said scanning is in a parallel direction to a line transverse to and intersecting said arc.

3. The method of claim 2 wherein said scan is a direct scan.

4. A system for scanning film comprising means for disposing said film along a curved path defining an arc, a segment of said path extending between a first and a second location;

means for directing light from said first location through said film and said segment to said second location; and means for collecting said light at said second location comprising a linear scanner;

means for moving said film along said path during said scanning; and wherein said arc defines a radius of curvature;

said film defines a scan area on a surface facing said second location; and said first and second locations and said scan area lie along a line parallel to an offset from said radius of curvature.

5. The system of claim 4 wherein said scanner provides a scan in a parallel direction to a line transverse to and intersecting said arc.

6. The system of claim 5 wherein said scan is a direct scan.

7. The system of claim 6 wherein said arc defines a beginning point and an ending point at respective opposing ends of said arc; wherein said film defines opposing edges: and wherein means for moving comprises means for urging said film at said beginning point into support along said edges;

means for maintaining said support along said edges when said edges are moving between said beginning point and said ending point along said arc; and means for withdrawing said support of said edges at said end point of said arc as said film exits at said end point.

8. Apparatus for scanning film comprising drum assembly means for releasably urging said film along a curved path about an axis;

light source means for projecting light through said film from said first location;

scanner assembly means for scanning said light after passing through said film at a second location;

wherein said drum assembly means includes support means for releasably supporting outer opposing edges of said film as it traverses said path; and wherein said apparatus further includes means for rotating said drum assembly about said axis;

and wherein said support means comprises right and left support shoulder means.

9. The apparatus of claim 8 wherein said light source means and said scanner assembly means are disposed adjacent opposing sides of said film.

10. The apparatus of claim 9 wherein said first and said second locations are substantially diametrically opposed lying on a line offset from said axis.

11. The apparatus of claim 10 wherein said first location is disposed radially outwards of said drum assembly.

12. The apparatus of claim 11 wherein said second location is disposed radially outward of said drum assembly.

13. The apparatus of claim 12 further including lens assembly means disposed between said light source means and said scanner assembly means for focusing said light from said light source means onto said scanner assembly means.

14. The apparatus of claim 13 wherein said lens assembly means is disposed internally of said drum assembly and along said line adjacent said axis.

15. The apparatus of claim 8 further including retention means for releasably retaining said edges of said film on said support means so as to cause said film to rotate with said drum assembly.

16. The apparatus of claim 15 wherein said retention means comprises a pair of retention bands, each of said bands being disposed radially outwards about a portion of a respective one of said right and left shoulder support means.

17. The apparatus of claim 16 wherein said edges are in sliding engagement relative to said retention bands during said rotating of said drum assembly means.

18. The apparatus of claim 17 further including right and left film retention ridge means, each of said ridge means being disposed radially outwards of and around a respective said right and left shoulder support means for releasably retaining said film against said right and left shoulder support means respectively in a rotationally immobile relationship relative to said drum assembly during said rotation.

19. The apparatus of claim 18 wherein said drum assembly further includes a plurality of pairs of slide support slot means for releasably retaining slides on said drum assembly during said rotation, each of said pairs of slide support slot means being comprised of a right and left support slot.

20. The apparatus of claim 19 wherein said slide support slot means are disposed axially outwards of said support shoulders.

21. The apparatus of claim 20 wherein each said right and left slide support slot is adjacent and axially outwards of a portion of a corresponding right and left support shoulder.

22. The apparatus of claim 21 wherein said light source means, said lens assembly means, and said scanner assembly means define a direct optical path from said light source through said lens to said scanner.

23. The apparatus of claim 8 further including a plurality of pairs of film support shoulders means, each said pair lying in a different one of a plurality of parallel planes, for guiding said film into engagement with said drum assembly means.

* * * * *